May 18, 1965     C. M. LEE ETAL     3,184,652

AUTOMATIC EXPOSURE CONTROL FOR PHOTOGRAPHIC CAMERAS

Original Filed July 17, 1959     4 Sheets-Sheet 1

CHARLES M. LEE
RALPH E. GUENTHER
HUBERT NERWIN
INVENTORS

BY *R. Frank Smith*
*Robert W. Hampton*
ATTORNEYS

May 18, 1965   C. M. LEE ETAL   3,184,652
AUTOMATIC EXPOSURE CONTROL FOR PHOTOGRAPHIC CAMERAS
Original Filed July 17, 1959   4 Sheets-Sheet 2

CHARLES M. LEE
RALPH E. GUENTHER
HUBERT NERWIN
INVENTORS

BY R. Frank Smith
Robert W. Hampton
ATTORNEYS

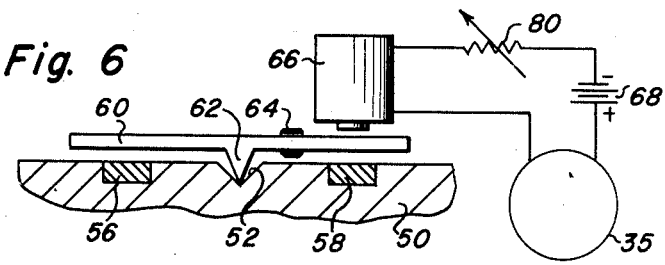
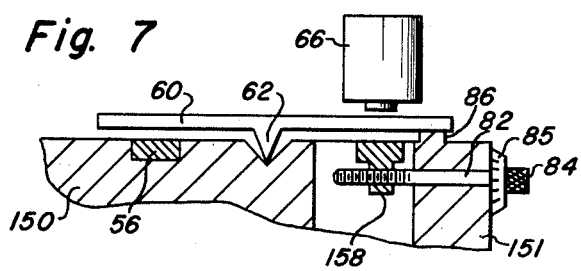
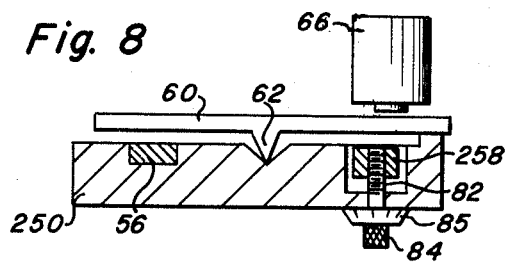
CHARLES M. LEE
RALPH E. GUENTHER
HUBERT NERWIN
INVENTORS
BY R. Frank Smith
Robert W. Hampton
ATTORNEYS

CHARLES M. LEE
RALPH E. GUENTHER
HUBERT NERWIN
INVENTORS

BY R. Frank Smith
Robert W. Hampton
ATTORNEYS

United States Patent Office 3,184,652
Patented May 18, 1965

3,184,652
AUTOMATIC EXPOSURE CONTROL FOR PHOTOGRAPHIC CAMERAS

Charles M. Lee, Ralph E. Guenther, and Hubert Nerwin, Rochester, N.Y., assignors to Eastman Kodak Company, Rochester, N.Y., a corporation of New Jersey
Original application July 17, 1959, Ser. No. 827,769, now Patent No. 3,027,818, dated Apr. 3, 1962. Divided and this application Feb. 1, 1961, Ser. No. 86,358
10 Claims. (Cl. 317—157)

The present invention relate to photographic cameras and more particularly to devices for automatically regulating the exposure of film in such cameras in response to changes in scene brightness. This application is a division of U.S. application Serial No. 827,769, filed July 17, 1959, and now Patent No. 3,027,818.

A camera having automatic exposure control system generally includes a photoelectric cell in combination with some driving means energized by the cell to adjust either the diaphragm aperture or the shutter speed, or both, in response to the changes in intensity of the scene lighting. The driving means most commonly used in prior art exposure control systems comprises a galvanometer-type electric measuring instrument having a pivoted coil which is angularly positioned as a function of the light intensity. This instrument is delicate and relatively expensive and may require a considerable amount of attention for calibration and maintenance.

It is therefore a primary object of the present invention to automatically regulate the exposure of film in a camera, particularly a still camera, in response to changes in scene brightness, by means of a simple, rugged device which is differentially energized or controlled by a photoelectric cell receiving light from such scene. This object is realized by employing a pair of coupled diaphragms, one in front of the photocell and one in front of the film on the taking-lens axis. Both diaphragms are initially closed and both are gradually opened in response to manual depression of a camera operating lever. When the photocell diaphragm opens sufficiently so that the photocell is energized to a predetermined degree, a magnetic toggle is tripped by the photocell and blocks further opening of the taking-lens diaphragm which is thereby set to an opening that corresponds to scene brightness.

Although the invention in its illustrated form contemplates automatic setting of the taking-lens diaphragm, it will be obvious to those skilled in the art that the shutter speed of a camera may be adjusted in that manner and that the taking-lens diaphragm may be separately adjusted. Alternatively, both shutter speed and taking-lens diaphragm, mutually coupled, may be adjusted automatically in accordance with the invention.

Another object of the invention is to provide a simple and reliable magnetic toggle for use in exposure control systems.

A further object of the invention is to adjust such toggle in order to calibrate it or to compensate for one or more exposure factors of a camera.

Other objects of the invention will appear from the following description, reference being made to the accompanying drawings, wherein:

FIG. 6 shows a variable resistance circuit for adjusting the toggle to compensate for film speed;

FIGS. 7 to 10 show alternate means of adjusting the toggle;

Exposure control system

Figure 1:
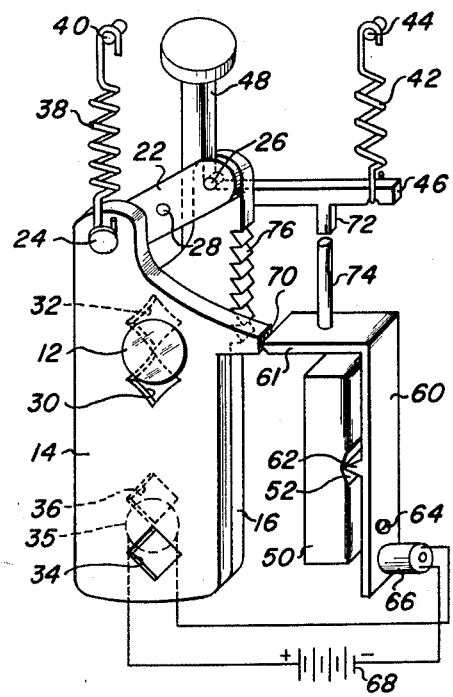
FIG. 1 is an isometric view of an exposure control system constructed in accordance with one form of the invention.
Figure 2:
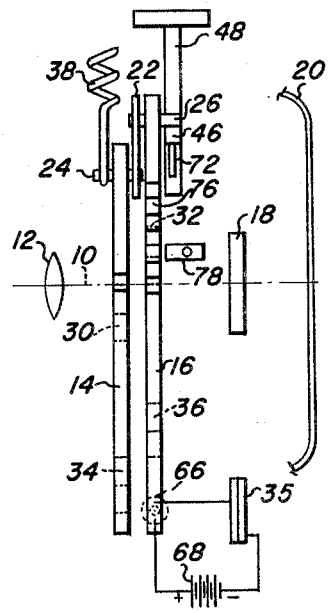
FIG. 2 is a schematic right side view of the mechanism shown in FIG. 1, also showing the usual camera elements on the taking-lens axis.

Referring to FIGS. 1 and 2, a preferred form of automatic exposure control system constructed according to the present invention is applied to a still camera having a taking-lens axis 10 on which are arranged a taking-lens system indicated at 12, a pair of diaphragm blades 14 and 16, a shutter mechanism 18 and a photosensitive surface such as a film strip 20. Diaphragm blades 14 and 16 are coupled together by a link 22 to which the blades are pivotally attached at 24 and 26, respectively. Link 22 is pivoted on a fixed stud 28.

Blades 14 and 16 have two pairs of cooperating apertures. A first aperture 30 in blade 14 cooperates with an aperture 32 in blade 16 to establish a composite exposure aperture on the taking-lens axis 10. A second aperture 34 in blade 14 cooperates with an aperture 36 in blade 16 to form a composite control aperture for a photocell 35 lying behind the blades. Blade 14 is urged upward by a spring 38 secured to a fixed post 40 and thereby urges link 22 clockwise and blade 16 downward toward a position wherein aperture 30 overlaps aperture 32 and aperture 34 overlaps aperture 36. However, blade 16 normally is maintained in its extreme upward position thereby maintaining link 22 in its counterclockwise position and blade 14 in its extreme downward position and the apertures are thereby normally maintained in mutually blocking relation. This is accomplished by a stronger spring 42 which is secured between a fixed post 44 and an arm 46 of the camera operating lever 48. Pin 26 of link 22 rests on the top surface of arm 46 and is held in its upward position by that arm against the tension of the lighter spring 38.

Upon manual depression of the operating lever 48, overcoming the tension of spring 42, pin 26 is permitted to move downward under the tension of spring 38. Therefore blade 16 moves downward and blade 14 moves upward and the apertures in each pair move into overlapping relation. When the photocell 35 is exposed to scene light through apertures 34 and 36 sufficiently to be energized to a predetermined level it trips a magnetic toggle, which blocks further movement of the blades and limits the overlap of apertures 30 and 32 to an area corresponding to the existing scene brightness.

Figure 3:
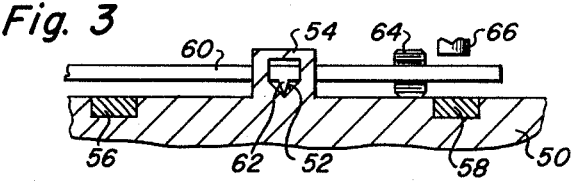
FIG. 3 is a right side view of the magnetic toggle in its initial condition.
Figure 4:
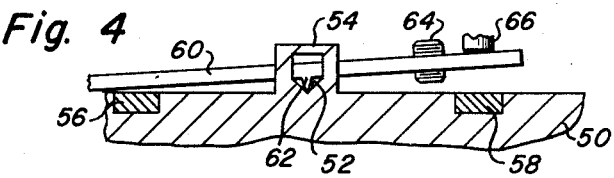
FIG. 4 is a view of the toggle of FIG. 3 after it has been tripped.
Figure 5:
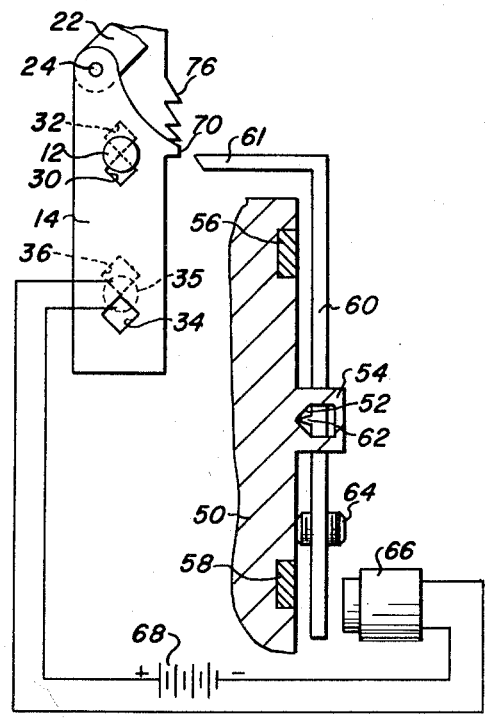
FIG. 5 is a right side view of the toggle arranged to cooperate with the exposure control system of a camera.

Referring to FIGS. 3-5, the toggle comprises a nonmagnetic block 50 having a V-shaped notch 52 enclosed in a keeper 54 and having a pair of permanent magnets 56 and 58 spaced in opposite directions from the notch 52. A soft iron rocker 60 extends through keeper 54 and is integral with a knife edge member or "knife" 62, which rests in notch 52. An adjusting screw 64 is in threading engagement with rocker 60 and extends through the rocker for engagement with the face of block 50. Normally the righthand side of the rocker is slightly closer than its lefthand side to block 50, or magnet 58 is slightly stronger than magnet 56, so that the rocker tends to remain in the position shown in FIG. 3 with the adjusting screw abutting the face of block 50. To trip the toggle, the righthand side of rocker 60 is pulled away from block 50 and the lefthand side of the rocker is pulled toward the block and may engage the block for limiting movement of the rocker.

The tripping mechanism for the toggle comprises an electromagnet 66 which is energized, or whose energization is controlled by photocell 35, and which is spaced from the righthand end of rocker 60 opposite magnet 58. For this purpose it is preferred that the photocell be a photoconductive device, such as a cadmium sulfide cell. It is well known that a photoconductive device may be used in series with a source of potential to vary the resistance of a circuit as a function of the intensity of light falling on the cell. In the present invention, cell 35 may be in series with a battery 68 and the electromagnet 66. As the control aperture, comprising apertures 34 and 36, increases in size during depression of lever 48, the cell energization increases and its resistance decreases until the electromagnet is sufficiently energized to pivot rocker 60 counterclockwise about knife 62 against the differential magnetic attraction of magnets 56 and 58. The pivoting of rocker 60 constitutes a tripping of the toggle and is employed to limit further movement of diaphragm blades 14 and 16, as follows:

Referring to FIGS. 1 and 5, when rocker 60 is pivoted counterclockwise by tripping the magnetic toggle, a nose 61 on the rocker moves leftward toward blades 14 and 16. If the toggle is tripped before the exposure aperture has reached a predetermined minimum size, this indicates that the scene brightness is greater than provided for by the exposure range of the camera. In such case nose 61 of rocker 60 engages a nose 70 on diaphragm blade 14 and is prevented from further leftward movement. In such case a member 72, which is secured to arm 46 of lever 48, engages a member 74 on nose 61 of rocker 60 and blocks further depression of the operating lever.

If the scene brightness is within the camera range, nose 70 moves out of the path of nose 61 and the latter engages one of a series of teeth 76 on diaphragm blade 16, thereby stopping both blades and establishing an exposure aperture corresponding to scene brightness. In this case, member 74 moves out of the path of member 72 and full depression of the camera operating lever 48 is possible. Arm 46 of the operating lever moves downward away from pin 26, which no longer follows that arm. At substantially full depression of the operating lever 48 its lower end engages a tripping lever 78 (FIG. 2) for operating the shutter and thereby making a photographic exposure.

If the scene brightness is below the camera range, the toggle is not tripped even at full exposure aperture and members 72 and 74 engage to prevent full depression of the camera operating lever 48, so that the shutter cannot be tripped.

*Toggle adjustments*

The magnetic toggle may be calibrated for sensitivity and magnet balance by adjustment of screw 64 (FIGS. 3–5). This adjustment also may be used to compensate for changes in film speed, shutter speed or other exposure factors such as filter attenuation. Other adjustments of the toggle to compensate for exposure factors are shown in FIGS. 6–10. In FIG. 6 there is shown a variable resistor 80 in series with the electromagnet 66. Adjustment of resistor 80 changes the sensitivity of the electromagnet circuit and thereby adjusts the tripping threshold of the toggle.

Figure 9:
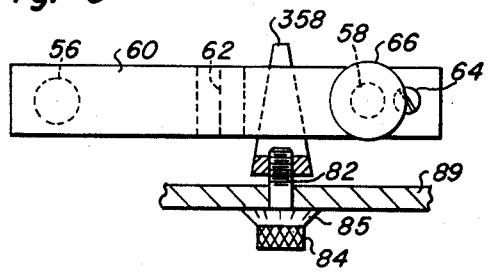

In FIG. 7 there is shown a mechanism for adjusting one of the permanent magnets, indicated at 158. This magnet is in threading engagement with a screw 82, which is supported in a wall 151 of block 150. A knurled knob 84 may be turned manually to move magnet 158 toward or away from the pivot knife 62 and thereby adjust the tripping threshold of the toggle. The adjustment may be calibrated in any convenient units such as film speed and may be read on a scale member 85, which rotates with knob 84. In the reset position of the toggle the righthand end of rocker 60 may rest against an extension 86 of block 150 to establish a proper reset spacing between rocker 60 and magnet 158. A similar adjustment is shown in FIG. 8 wherein one magnet 258 is adjustable by screw 82 and knob 84 toward and away from the electromagnet 66. In FIG. 9 there is shown an adjusting system wherein a wedge-shaped bias magnet 358, which may replace or supplement one of the permanent magnets previously described, is adjustable in a plane parallel to a rocker 60 by means of screw 82 mounted in a frame member 89. Magnet 358 is moved, by this adjustment, into greater or lesser overlapping relation with rocker 60, thereby changing the tripping threshold of the toggle.

Figure 10:
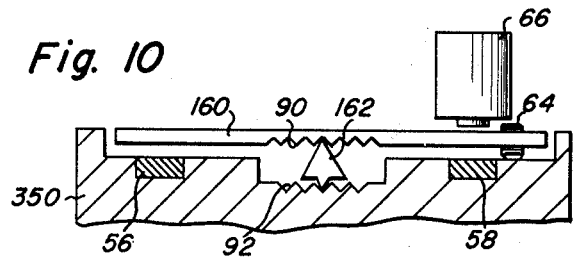

The pivoted position of the rocker also may be adjusted, as illustrated in FIG. 10 wherein rocker 160 and block 350 are provided with respective series of notches 90 and 92 and the pivot knife 162 may be moved into cooperation with any opposed pair of these notches for adjusting the tripping threshold.

Figure 11:
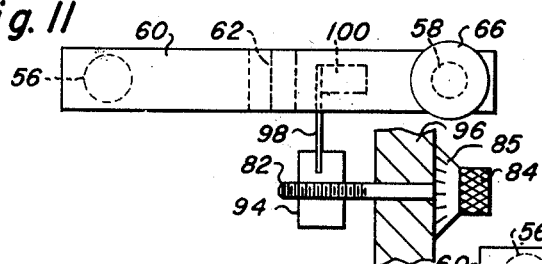
FIG. 11 shows a first temperature compensating means for the toggle.
Figure 13:
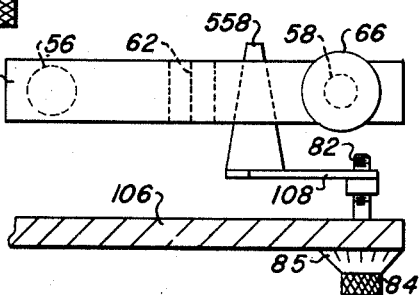
FIGS. 12 and 13 show alternate temperature compensating means for the toggle.
Figure 12:
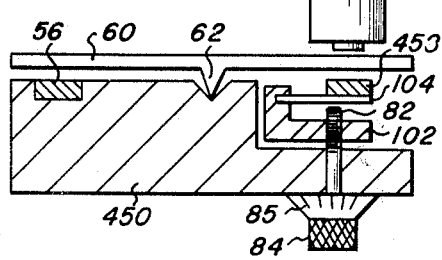

Some of the forms of photocell that are useful with the present invention have temperature characteristics such that the sensitivity of the photocell circuit varies as a function of the ambient temperature. In order to compensate for such temperature variation, the present invention contemplates the use of a temperature sensitive device for moving a bias magnet relative to the toggle rocker as a function of the ambient temperature. Three forms of such temperature compensating structure are shown in FIGS. 11–13. In FIG. 11, screw 82 is supported in a frame member 96 and is adjustable as described above by a knurled knob 84 cooperating with an exposure-factor scale member 85. Screw 82 is in threading engagement with a block 94 which supports a bimetallic arm 98. A bias magnet 100 is secured to the free end of arm 98 and is adjustable toward and away from knife 62, by adjustment of knob 84, to compensate for a selected exposure factor. The bimetallic arm 98 also moves the bias magnet 100 in response to temperature changes, thereby effecting a further adjustment of the bias magnet to compensate for the temperature characteristic of the photocell.

In FIG. 12 screw 82 is supported by the block 450 and in turn supports smaller block 102 from which depends a bimetallic arm 104. One of the principal magnets 458 is supported by the free end of the bimetallic arm 104 and is adjustable both by arm 104 and by adjustment of knob 84 to move magnet 458 toward and away from electromagnet 66, thereby compensating for changes in the selected exposure factor and changes in the ambient temperature. A similar structure is shown in FIG. 13 wherein screw 82 is supported in a frame member 106 and in turn supports a bimetallic element 108, on the end of which is attached a wedge-shaped bias magnet 558. Adjustment of knob 84 compensates for changes in the selected exposure factor, while temperature warping of arm 108 adjusts for changes in the ambient temperature, both of these compensations being achieved by moving magnet 558 into lesser or greater overlapping relation with rocker 60.

The invention has been described in detail with particular reference to preferred embodiments thereof, but it will be understood that variations and modifications can be effected within the spirit and scope of the invention as described hereinabove and as defined in the appended claims.

We claim:

1. In a camera having means for producing an electric current, a threshold-sensing magnetic toggle comprising: a block having a notch therein and a pair of permanent magnets spaced oppositely from said notch, a rocker having a pivoting edge adapted to cooperate with said notch and having a pair of magnetic portions disposed in cooperative relation with respective ones of said permanent magnets, said rocker being movable between a first and a second position and said permanent magnets being disposed to cause a first one of said permanent magnets to attract said rocker with greater magnetic force than the second of said permanent magnets for causing said rocker to be normally retained in said first position; means normally maintaining each of the magnetic portions of said rocker separated from the corresponding permanent magnet by a respective predetermined spacing when said rocker is in said first and in said second position; an electromagnet disposed in cooperative relation with one of the magnetic portions of said rocker to provide a magnetic field opposing said first permanent magnet when said electromagnet is energized; and means for electrically connecting said electromagnet and said current producing means, said rocker being moved to said second position whenever said electromagnet is energized by a predetermined threshold current sufficient to cause said electromagnet and said second permanent magnet to exert a magnetic attraction on said rocker greater than the attraction of said first permanent magnet.

2. The magnetic toggle defined in claim 1, with means for moving one of said permanent magnets to adjust the sensitivity of said toggle.

3. The magnetic toggle defined in claim 2, wherein said moving means adjusts the spacing between said one permanent magnet and said notch.

4. The magnetic toggle defined in claim 2, wherein said moving means adjusts the spacing between said one permanent magnet and said rocker.

5. The magnetic toggle defined in claim 2, wherein said one permanent magnet is formed as a wedge in overlapping relation to said rocker, and wherein said moving means adjusts the overlapping relation between said wedge and said rocker.

6. The toggle defined in claim 1, with a bimetallic element supporting one of said permanent magnets to compensate for changes in ambient temperature.

7. The toggle defined in claim 6, with means for moving said bimetallic element, thereby to move said one permanent magnet for adjusting the sensitivity of said toggle.

8. The toggle defined in claim 7, wherein said moving means adjusts the spacing between said one permanent magnet and said notch.

9. The magnetic toggle defined in claim 7, wherein said moving means adjusts the spacing between said one permanent magnet and said rocker.

10. The magnetic toggle defined in claim 7, wherein said one permanent magnet is formed as a wedge in overlapping relation to said rocker, and wherein said moving means adjusts the overlapping relation between said wedge and said rocker.

References Cited by the Examiner

UNITED STATES PATENTS

| 115,967 | 6/71 | Little | 317—176 |
|---|---|---|---|
| 2,920,248 | 1/60 | Matthews | 317—131 |
| 2,927,177 | 3/60 | Nemeth | 200—87 |
| 2,955,174 | 10/60 | Richert | 200—93 |
| 2,960,583 | 11/60 | Fisher et al. | 200—87 |
| 2,976,379 | 3/61 | Rhodes | 317—197 |

FOREIGN PATENTS 94,571   2/39   Sweden.

SAMUEL BERNSTEIN, *Primary Examiner.*